Oct. 27, 1936.  W. G. HOLLINGSWORTH  2,058,982
ROBE HOLDING DEVICE
Filed May 9, 1935
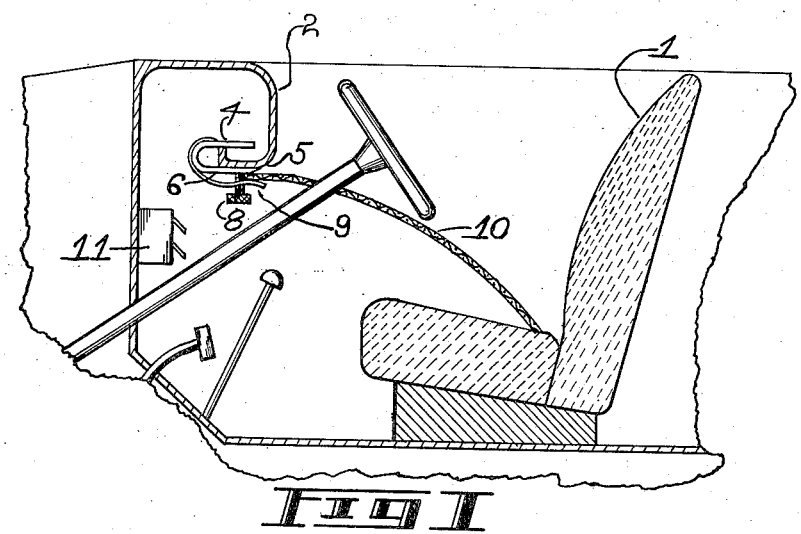
Fig I
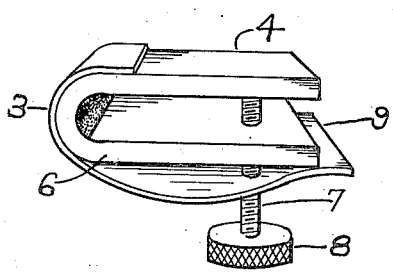
Fig II
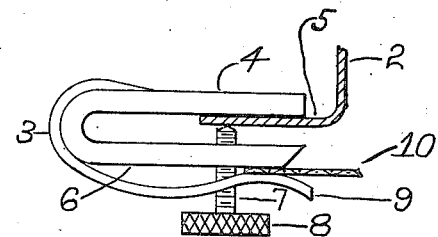
Fig III
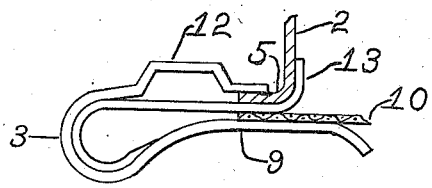
Fig IV
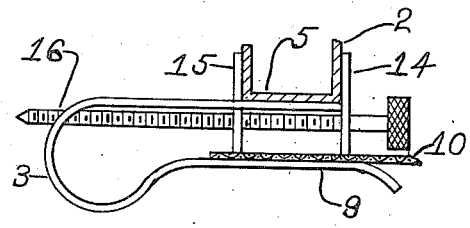
Fig V
INVENTOR
William G. Hollingsworth
BY
Lyman C. Conger
ATTORNEY Patented Oct. 27, 1936

2,058,982

UNITED STATES PATENT OFFICE 2,058,982

ROBE HOLDING DEVICE

William G. Hollingsworth, Sheboygan, Wis.

Application May 9, 1935, Serial No. 20,517

1 Claim. (Cl. 24—81)

My invention relates to improvements in robe holding devices of a type adapted to hold a robe or similar covering in a chosen position.

The difficulty of using a robe as a covering for the occupants of the front seat of an automobile, particularly the driver, is well known as such robe, if adjusted to give adequate protection also interferes with the operation of the clutch and brake pedals, gear shift lever, etc. and consequently the protection of a robe or covering is usually dispensed with by the driver of the automobile, even in severe weather.

The object of my invention is to provide means for holding a robe in such position as to provide adequate protection to the occupants of the front seat of an automobile without interference with the operation of the automobile.

A further object of my invention is to provide such means which will be adaptable for use on all different makes and models of automobiles now in commercial use.

I attain these objects by the means illustrated in the accompanying drawing, in which—

Figure 1 is a view of the front seat and instrument board of an automobile, partly in section, illustrating the use of my invention; Figure 2, a perspective view of the robe holding device; Figure 3, a side view thereof and Figures 4 and 5, side views of modified forms of the robe holding device.

Similar numerals refer to similar parts throughout the several views.

In the drawing the numeral 1 indicates the front or driver's seat of an automobile and 2 the dash or instrument board thereof.

The robe holding device, indicated generally by the numeral 3, comprises a portion or arm 4 adapted to overlie the backwardly projecting portion 5 of the instrument board 2 and a portion or arm 6 adapted to underlie said portion of the instrument board. All automobiles as now manufactured, are provided with the rearwardly projecting portion 5 of the instrument board, some having the portion 5 a simple right angled projection as shown in Figure 3 while in others the portion 5 is again bent upwards parallel to the face of the instrument board as shown in Figure 1.

The arm 6 is drilled and tapped to receive the screw 7 which is preferably provided with the knurled head 8 for greater convenience in adjustment. The screw 7 passes through the arm 6 and engages the portion 5 of the instrument board thus forcing the arm 4 into engagement therewith and clamping the instrument board between the arm 4 and the screw 7.

A spring clip 9 normally bears against the arm 6 but can be sprung sufficiently to allow the insertion of a robe 10 between said spring and the arm 6, the spring clip 9 furnishing sufficient pressure to hold the robe in this position.

A plurality of these devices are spaced at suitable intervals on the instrument board and thus a robe may be held in position to afford protection to the occupants of the front seat of the automobile yet, as seen from Figure 1, out of interference with the foot pedals, gear shift lever, etc. It will be noted too that the heater 11 is within the space enclosed by the robe and that the heat provided therefrom is confined within said space and conserved, thus affording the maximum comfort to the occupants of the automobile.

In the modified form shown in Figure 4 the spring clip 9 is extended to the top of the device at 12 and engages the portion 5 of the instrument board. An arm 13 abuts the instrument board which is held between said arm and the spring 12, the robe being held between the arm 13 and the clip 9.

In the modification shown in Figure 5 the spring clip 9 is extended into the arm 4. The arm 4 terminates in a clamping jaw 14 rigidly affixed thereto. A second clamping jaw 15 is slidably mounted on the arm 4. A screw 16 extends through the jaw 14 and is threaded in the jaw 15. By turning the screw 16 the jaw 15 may be moved to engage or disengage the instrument board 5 and clamp the device thereon.

It will be apparent that various changes from the specific constructions herein disclosed may be made without departing from the spirit of my invention and I therefore do not restrict myself to the exact forms of my invention herein disclosed but claim all modifications thereof within the spirit of my invention and the scope of the appended claim.

I claim:

The combination with an automobile instrument board having a backwardly projecting portion, of a robe holding device comprising an arm adapted to overlie said backwardly projecting portion, an arm adapted to underlie said backwardly projecting portion, screw clamping means having threaded engagement with said underlying arm and adapted to abut said backwardly projecting portion, and a spring clip abutting said underlying arm and adapted to hold a robe between said clip and said underlying arm.

WILLIAM G. HOLLINGSWORTH.